(12) United States Patent
Benitez (10) Patent No.: US 9,701,917 B2
(45) Date of Patent: Jul. 11, 2017

(54) SYSTEM, METHOD, AND APPARATUS FOR THE CREATION OF PARAHYDROGEN AND ATOMIC HYDROGEN, AND MIXING OF ATOMIC HYDROGEN WITH A GAS FOR FUEL

(71) Applicant: eCombustible Products, LLC, Miami, FL (US)

(72) Inventor: Ramiro Guerrero Benitez, Valle del Cauca (CO)

(73) Assignee: ECOMBUSTIBLE PRODUCTS, LLC, Miami, FL (US)

( * ) Notice: Subject to any disclaimer, the term of this patent is extended or adjusted under 35 U.S.C. 154(b) by 378 days.

(21) Appl. No.: 14/215,223

(22) Filed: Mar. 17, 2014

(65) Prior Publication Data

US 2014/0259922 A1 Sep. 18, 2014

Related U.S. Application Data

(60) Provisional application No. 61/792,733, filed on Mar. 15, 2013.

(51) Int. Cl.
| | |
|---|---|
| *B01J 7/00* | (2006.01) |
| *C10L 3/00* | (2006.01) |
| *B01J 19/08* | (2006.01) |
| *C25B 1/04* | (2006.01) |

(52) U.S. Cl.
CPC ............ *C10L 3/00* (2013.01); *B01J 19/087* (2013.01); *C25B 1/04* (2013.01); *C10L 2290/24* (2013.01); *C10L 2290/38* (2013.01)

(58) Field of Classification Search
CPC ...... C10L 2290/38; C25B 1/04; B01J 19/087; F17C 2221/012; Y02E 60/366; Y10S 204/09
See application file for complete search history.

(56) References Cited

U.S. PATENT DOCUMENTS

| | | | | |
|---|---|---|---|---|
| 4,747,925 A * | 5/1988 | Hasebe | ..................... | C25B 1/04 204/270 |
| 6,126,794 A * | 10/2000 | Chambers | ................. | C25B 1/04 204/230.5 |
| 6,503,584 B1 * | 1/2003 | McAlister | ................. | F17C 1/02 220/560.04 |
| 8,464,667 B1 * | 6/2013 | Stama | ..................... | C25B 15/08 123/2 |

(Continued)

*Primary Examiner* — Imran Akram
(74) *Attorney, Agent, or Firm* — Shumaker, Loop & Kendrick, LLP; William A. Ziehler (57) ABSTRACT

Disclosed herein are novel systems and methods for performing the following: decomposing water into hydrogen by using low-power consumption electrolysis, converting orthohydrogen into parahydrogen by using vibrational frequency, converting parahydrogen into atomic hydrogen, and mixing converted atomic hydrogen with combustible gas. The system uses a unique low-power hydrogen production cell to perform electrolysis on water. Hydrogen output from the production cell runs through coils under vibrational frequency to optimally convert orthohydrogen to parahydrogen. The system further comprises a magnetic reactor that is used to convert parahydrogen into atomic hydrogen, which is in turn mixed with combustible gas to create an eco-friendly fuel.

12 Claims, 5 Drawing Sheets

(56) References Cited

U.S. PATENT DOCUMENTS

| | | | | |
|---|---|---|---|---|
| 2002/0179453 | A1* | 12/2002 | Chambers | C25B 1/04 205/628 |
| 2003/0141200 | A1* | 7/2003 | Harada | C25B 1/12 205/637 |
| 2004/0108203 | A1* | 6/2004 | Sullivan | C25B 1/04 204/276 |
| 2004/0118677 | A1* | 6/2004 | Streckert | C25B 1/04 204/237 |
| 2009/0129992 | A1* | 5/2009 | Mills | B01J 19/087 422/112 |
| 2010/0015038 | A1* | 1/2010 | Inoue | F17C 7/02 423/649 |
| 2011/0198236 | A1* | 8/2011 | Sumita | B01D 61/025 205/746 |
| 2014/0034481 | A1* | 2/2014 | Waddell | B01J 19/087 204/157.15 |

* cited by examiner

SYSTEM, METHOD, AND APPARATUS FOR THE CREATION OF PARAHYDROGEN AND ATOMIC HYDROGEN, AND MIXING OF ATOMIC HYDROGEN WITH A GAS FOR FUEL

CROSS-REFERENCE TO RELATED APPLICATIONS

This U.S. Non-Provisional application claims the benefit of U.S. Provisional Application No. 61/792,733, filed on Mar. 15, 2013, and is herein incorporated by reference in its entirety.

BACKGROUND OF THE INVENTION

Hydrogen is the simplest element and is the most plentiful element in the universe. Despite its simplicity and abundance, hydrogen does not occur naturally as a gas on Earth. Hydrogen is most often combined with other elements in molecules, such as water, but most notably in hydrocarbons that make up many of our fuels. Some of the most notable hydrocarbons in which hydrogen can be found are standard gasoline, natural gas, methanol, and propane. Hydrogen can be separated from hydrocarbons through the application of heat in a process known as reforming. In a different process known as electrolysis, electrical current can also be used to separate water into its components oxygen and hydrogen.

Hydrogen is very high in energy. Yet, when an engine burns pure hydrogen, it produces almost no pollution. The idea of using hydrogen in fuel has been around since the 1970s. In fact, NASA has used liquid hydrogen since that time to propel space shuttles and other rockets into orbit. Hydrogen fuel cells were used to even power the shuttles' entire electrical systems, all while producing a clean byproduct. Fuels cells have been, and continue to be, a promising area of discovery. They have the potential to provide heat and electricity for buildings, as well as electrical power source for electric motors. However, combustible fuels still dominate certain market sectors, notably the automotive industry.

Fossil fuel, particularly petroleum fuel, is the major contributor to energy production. Fossil fuel consumption has steadily risen over the years as a result of population growth. The world's population will continue to grow. Energy consumption will also continue to grow in a manner directly proportional to the population growth. Increasing energy demand requires increasing fuel production, which in turn drains current fossil fuel reserves at ever increasing rates. This trend has manifested itself in fluctuating oil prices and supply disruptions.

Rapidly depleting reserves of petroleum and decreasing air quality raise questions about the future. As world awareness about environmental protection increases, so too does the search for alternatives to petroleum fuel.

Alternative fuels such as compressed natural gas, liquefied petroleum gas, liquefied natural gas, bio-diesel, biogas, hydrogen, ethanol, methanol, and di-methyl ether have been tried worldwide. The fuels emit less air pollutants compared to gasoline, they are renewable, and most of them are more economically viable compared to oil. The use of hydrogen as a future fuel for internal combustion engines has been considered, but current systems have encountered obstacles preventing viable commercialization. Hydrogen blended with traditional fuels significantly improves flame stability during lean combustion. There is a longer-term need for efficient combustible fuels that minimize UHC and $CO_2$ emissions. The present invention provides a novel system, method, and apparatus for the creation of parahydrogen and atomic hydrogen, which can be mixed with oxygen, methane, propane, or other natural gases to provide a transition to carbon-free combustible fuel.

SUMMARY OF THE INVENTION

The present invention is based on the hydrogen production from the decomposition of water into oxygen and hydrogen molecules by means of pulsed electric current such that principally parahydrogen is created. The present invention also applies a merger of the hydrogen atoms with oxygen gas or natural gas or propane or gaseous diesel fuel in the case of diesel engines.

Hydrogen produced in a hydrogen production plant is diatomic, i.e., the molecule consists of two atoms, H2. The hydrogen created is both orthohydrogen and parahydrogen, which are spin isomers of hydrogen. Orthohydrogen is the isomeric form of molecular hydrogen where its two proton spins are aligned in parallel. Parahydrogen, on the other hand, is the isomeric counterpart, where its two proton spins are aligned in antiparallel fashion. At room temperature and thermal equilibrium, molecular hydrogen consists of approximately 75% orthohydrogen and 25% parahydrogen. For the purpose of the present invention, it is helpful to create and work with only the parahydrogen form of molecular hydrogen. In an aspect of the present invention, orthohydrogen is entirely converted to parahydrogen by feeding orthohydrogen through a coil to which vibrational frequency is applied. In another aspect of the invention, the parahydrogen is converted to atomic hydrogen which efficiently mixes with another gas for use as a fuel.

A mixture of diatomic hydrogen (orthohydrogen and parahydrogen) is created by a hydrogen production cell. Orthohydrogen is then converted to parahydrogen. The parahydrogen is passed through a pipeline and then passes through a reactor to dissociate parahydrogen into atomic hydrogen. Dissociation of parahydrogen into atomic hydrogen is accomplished by passing the parahydrogen through a magnetic field at low speed, in which the parahydrogen is exposed to a magnetic field of a frequency very close to the vibrational frequency of the parahydrogen—about 2.58× 1000 Hz.

Upon leaving the reactor, atomic hydrogen is transported to a mix tank. In the mix tank, the atomic hydrogen is mixed with another gas, such as oxygen or methane, to create an eco-friendly combustible gas mixture. Inside the mix tank, atomic hydrogen and CH4 (or oxygen or other gas) may mix upon contact by the magnetic attraction of each of the components, creating links between the gases resulting in a new overall fuel. This new mixed fuel provides the following beneficial features: lower burning speed than pure atomic hydrogen (which helps prevent pre-ignition inside an engine) and dramatic improvement in engine thrust. Once mixed, the mixed gas exits the mix tank through a pipe to a compressor where the mixture may be stored and then distributed as a fuel. The atomic hydrogen and the mixed fuel discussed herein may be used for internal combustion engines, Otto engines, and Diesel cycle engines. The novel system is referred to herein as an ecombustible system.

DETAILED DESCRIPTION OF THE INVENTION

Figure 1:
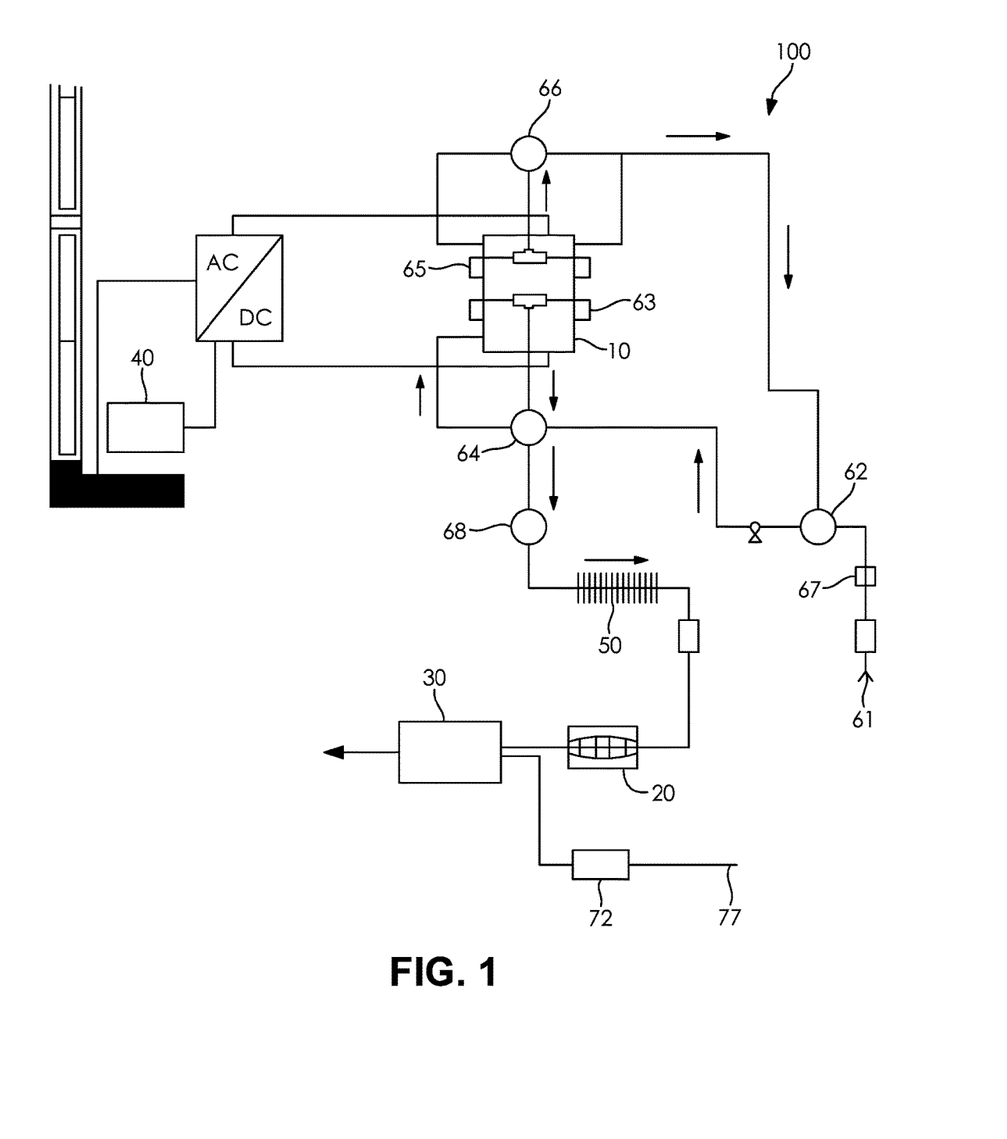
FIG. 1 is a flow diagram of an ecombustible system for creating parahydrogen and atomic hydrogen, and then mixing atomic hydrogen with a gas.

Referring to FIG. 1, one specific embodiment of a system, ecombustible system 100, for creating parahydrogen and atomic hydrogen, and then for mixing atomic hydrogen with gas includes: system control 40, water supply 61, H2O column 62, one or more valves 67, hydrogen production cell 10, O2 column 66, H2 column 64, water trap 68, filter 50, magnetic reactor 20, combustible gas feed 71, gas holding tank 72, and a mix tank 30.

As shown in FIG. 1, water for the operation of the electrolysis starts from water supply 61 and flows to a valve 67. One skilled in the art would appreciate that one or more valves may be placed throughout the system to control fluid flow. The valves may be controlled individually or by system control 40. Valve 67 may be a solenoid valve or any other type of valve that is known in the art. The ecombustible system 100 of FIG. 1 may include pauses in the operation to allow the system to reach equilibrium before taking the next step. For example, ecombustible system 100 can hold up or speed up fluid flow as necessary so as to prevent buildup at any single component. Valve 67 is normally closed when ecombustible system 100 begins program operation. System control 40, which includes a valve controller, power controller, and a frequency controller, may sense a low level of water for the system in H2O column 62 during operation. System control 40 should be understood to be one or more computing devices, operating individually or in conjunction, which run software systems known in the art that implements a generic hierarchical control system. Real-time Control System (RCS) may be an example of such software, but one skilled in the art would appreciate that software coded in any known language (e.g., C++ or Java) may be used in the system control 40 to provide real-time control of all aspects of ecombustible system 100. In response to a low water level reading in H2O column 62, system control 40 opens valve 67 so that the water starts to flow into H2O column 62 until the water level reaches a high level sensor in H2O column 62. At that point, system control 40 closes valve 67. Then, system control 40 may detect via a sensor in H2 column 64 that there is a low level of water. System control 40 responds in a similar manner. It turns on a valve (distinct from valve 67, but not shown in FIG. 1), which allows water to enter H2 column 64.

H2 column 64 is connected to hydrogen production cell 10 by piping, for example, at the bottom of hydrogen production cell 10. O2 column 66 is similarly connected to hydrogen production cell 10. Piping connecting O2 column 66 to hydrogen production cell 10 can be located at the top of hydrogen production cell 10, as opposed to the bottom, where piping to H2 column 64 may be connected. Piping runs from hydrogen production cell 10 to O2 column 66 and may connect at the bottom of O2 column 66. The description of piping connections above is for a preferred embodiment, but should not be understood to be an exclusive arrangement or setup.

In one embodiment, the filling process stops when a sensor in H2 column 64 senses the presence of a high water level. System control 40 at that point would sense that H2 column 64 has reached the preferred level of operation. System control 40 then shuts down valve 67 so that filling of H2O column 62 tank is stopped. System control 40 then applies electrical current pulses to hydrogen production cell 10. Application may be automated by system control 40, and may escalate in three steps. For example, about one-third of the total necessary current is applied to start the process, half of the operating current is applied at three minutes, and the total current within six minutes.

When electric pulses are applied during electrolysis, hydrogen production cell 10 begins to produce oxygen and hydrogen (a mixture of orthohydrogen and parahydrogen). Oxygen exits hydrogen production cell 10 via exit stream 65 and hydrogen flows via exit stream 63 in another direction to H2 column 64. Hydrogen may be released from hydrogen production cell 10 at a pressure of about 1 psi up to and including about 15 psi, but preferably about 2 psi up to and including about 5 psi. Hydrogen may be introduced into H2 column 64 below water, producing bubbles rising to the top. Hydrogen exiting hydrogen production cell 10 is entirely parahydrogen Hydrogen would then flow from tank H2 column 64 to water trap 68. Water trap 68 is preferably a vertical separation tower. In water trap 68, the hydrogen enters through the middle and out at a high point so that any trace amounts of water in the hydrogen may be removed as it falls to the bottom. Thus, the water is drained from the hydrogen by gravity.

After leaving water trap 68, hydrogen enters a filter 50, where it is again filtered to trap additional traces of water. This filtration process occurs by passing the hydrogen through a filter for secondary moisture extractor. Filter 50 comprises a filter stone with silica. Filter 50 further comprises a hydrogen purification element, such as palladium or any other oxygen removing agent known in the art, for removing any oxygen. It is the object of filter 50 to remove all remaining traces of water and oxygen so as to isolate the parahydrogen.

The parahydrogen is then converted to atomic hydrogen by passing it through magnetic reactor 20, as shown in FIG. 1. Magnetic reactor 20 is shown in more detail in FIG. 8 and will be discussed more fully in a subsequent portion of the detailed description. By passing the parahydrogen through magnetic reactor 20 providing a magnetic field having a frequency of about 25.58 kHz, the parahydrogen is converted to atomic hydrogen. Once parahydrogen is converted to atomic hydrogen, it is fed into mix tank 30, where it mixes with combustible gas fed from gas holding tank 72 and combustible gas feed 71. Combustible gas is fed into mix tank 30 from gas holding tank 72. In preferred embodiments, combustible gas can be oxygen or a common hydrocarbon, such as methane, propane, diesel gas, or natural gas. Combustible gas is introduced by a pipe at a pressure of about 2 psi to about 10 psi when combustible gas is a hydrocarbon, such as methane gas, and at a pressure of about 1.0 psi to about 2.0 psi when combustible gas is oxygen. When combustible gas is methane gas, it is preferred that combustible gas enters mix tank 30 at a pressure of about 5.0 psi. When combustible gas is oxygen gas, it is preferred that combustible gas enters mix tank 30 at a pressure of about 1.0 psi. System control 40 causes combustible gas to enter mix tank 30 according to a dosing system, such that combustible gas enters at approximately 2% to 4% by volume of the total parahydrogen produced in hydrogen production cell 10.

The oxygen path is as follows. The oxygen exits through the side of hydrogen production cell 10 via exit stream 63, as shown in FIG. 1. After leaving hydrogen production cell 10, oxygen enters O2 column 66. The oxygen may enter the tank below an internal water level in O2 column 66, which produces bubbles that rise to the upper level of the column. The oxygen may then be routed back to H2O column 62. From there, the oxygen may be released from the upper portion of H2O column 62 into the ambient air. Alternatively, the oxygen may be captured for alternative use.

Hydrogen Production Cell

Figure 2:
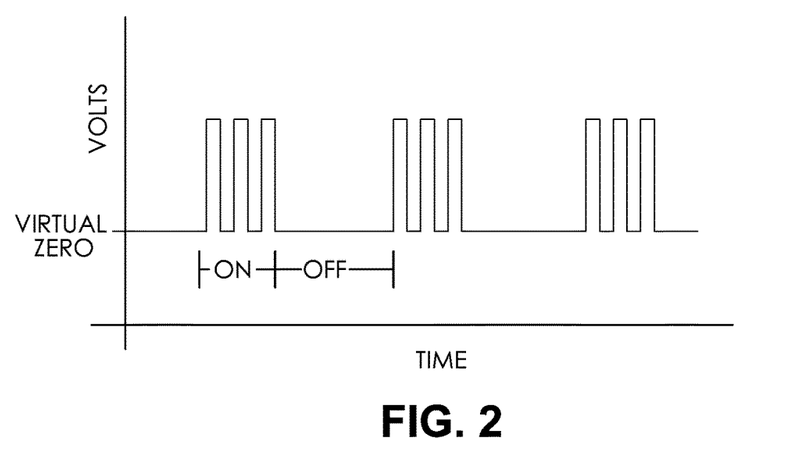
FIG. 2 shows the electrical pulses that are applied to the hydrogen production cell.

The decomposition of water is accomplished by configuring a hydrogen production cell 10 based upon electrolysis. Using electrolysis to cleave hydrogen from water is well known, but this invention provides for running an electrolysis process in hydrogen production cell 10 at uniquely low power consumption levels. By applying electrical pulses at a frequency of about 4 Hz to about 10 Hz (preferably about 7 Hz), the molecular bonds between the oxygen and hydrogen atoms in the water molecules weaken. One working form of a pulse is illustrated in FIG. 2. As shown in FIG. 2, when the electrical pulses are "on," voltage is applied for a period, and then when the electrical pulses are switched "off," the voltage returns to virtual zero. Hydrogen production cell 10 continues to produce hydrogen even when the pulses are switched off, however. In hydrogen production cell 10, water is applied in a continuous stream over stainless steel plates that are electrodes of the hydrogen production cell (shown as electrodes 11 and 12 in FIGS. 3-5. An electric current density is placed upon the electrodes 11/12 of 0.05 amperes per stainless steel plate. Preferably, the electric current density placed upon the electrodes is about 0.01 up to and including about 0.08 amperes per square centimeter of stainless steel plate.

Figure 4:
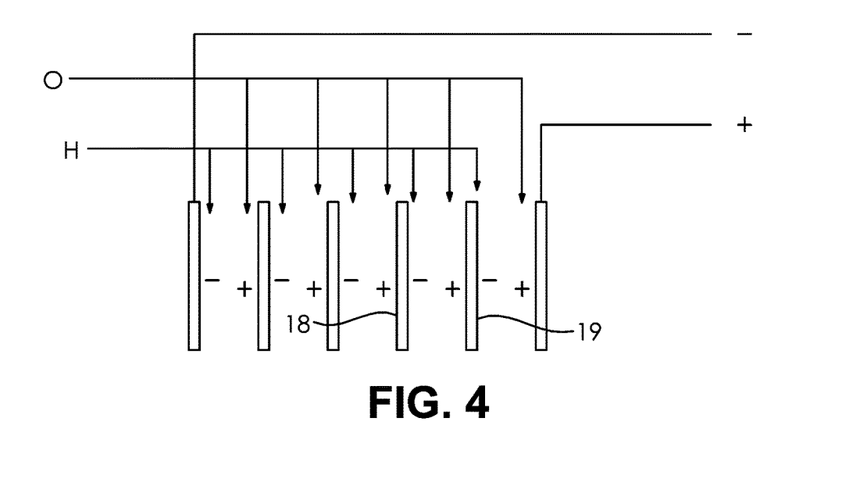
FIG. 4 shows electrodes in series for the separation of oxygen from hydrogen in the hydrogen production cell, as well as a set of coils for converting orthohydrogen into parahydrogen.
Figure 5:
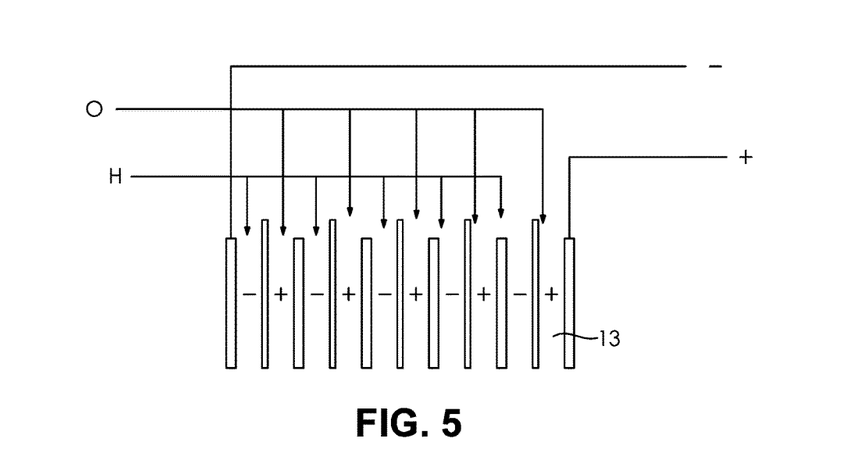
FIG. 5 shows electrodes in series with membranes to prevent mixing hydrogen and oxygen gas.

Hydrogen production cell 10 comprises two or more microcells 15 connected together. In a preferred embodiment, hydrogen production cell 10 contains several microcells, each microcell comprising two electrodes and a membrane, one after another. Microcells are connected together by placing one after the other, this connection is typically called series connection. FIGS. 4-5 show representative illustrations of microcells connected in a series connection. In operation, when the electric pulses sent into the microcells, the electrodes 11 and 12 become polarized, one positively charged and one negatively charged. Hydrogen—being a positively charged—is attracted to the negative electrical connection point and oxygen—being negatively charged—is attracted to the positive electrical connection point. This separation of hydrogen from oxygen the fundamental objective of electrolysis. The oxygen-hydrogen separation is shown in FIGS. 4-5. In FIG. 4, is a schematic of "electrodes" arranged in series, wherein the far right electrode is positively charged and the far left electrode is negatively charged. Thus, each electrode in between the poles has a positive face 18 and a negative face face 19. As indicated by the lines, oxygen is drawn to the positive faces, while hydrogen is drawn to the negative faces.

FIG. 4 also depicts a set of coils, which are positioned at each hydrogen output of each microcell. Hydrogen that runs through this set of coils converts any orthohydrogen to parahydrogen by applying a vibrational frequency that is very close to the natural frequency of proton spin in parahydrogen. Namely, the frequency is preferably about 25.58 kHz. This particular frequency causes the proton spin in all exiting hydrogen to spin in an antiparallel fashion. The vibrational frequency causes the direction of the proton spin in orthohydrogen to misalign, or reverse, such that instead of both protons spinning in the same direction, the protons spin in opposite direction (thus becoming parahydrogen).

Figure 3:
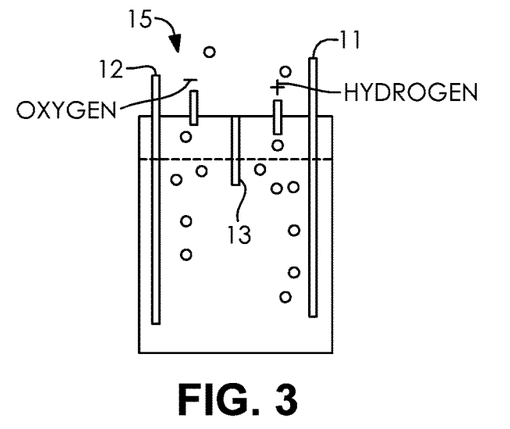
FIG. 3 shows one compact micro-cell of the hydrogen production cell.

A single microcell 15 is shown in FIG. 3. Microcell 15 contains two electrodes 11 and 12 and a separating membrane 13. When electric pulses are applied to the microcell, electrode 12 becomes positively charged, whereas electrode 11 becomes negatively charged. In one embodiment, electrodes are steel plates having dimensions of approximately 120 cm×200 cm. The steel plates (i.e., electrodes) are arranged in the several microcells. Such an arrangement provides for hydrogen production of 80,000 m3/month. To collect hydrogen and oxygen gas produced during electrolysis, each microcell is provided with two holes, which, when assembling the cell, connected to and coinciding with each other, forming a duct for hydrogen collection.

When microcells are arranged in a series connection, the electrodes are separated from each other by two gaskets. The gaskets may be of heat resistant rubber or equivalent material and range in thickness from about 0.5 mm up to and including about 0.9 mm. In a preferred embodiment, the gaskets are about 0.5 mm thick and between them is a proton exchange membrane 13 which does not allow passage of oxygen from one side to another, thereby blocking the possibility having the oxygen mix with hydrogen created through hydrolysis. Proton exchange membranes are known in the art. Any semipermeable membrane designed to conduct protons while being impermeable to gases, such as oxygen and hydrogen, that is commercially available may be used. FIG. 5 shows a schematic of electrodes arranged in series just like FIG. 4, but also shows membranes (e.g., 13) in between each pair of electrodes. FIG. 5 represents how hydrogen production cell 10 operates during electrolysis, given hydrogen production cell 10 comprises multiple microcells connected in series to one another. While not explicitly depicting the connection of microcells, FIG. 5 shows the polarization of electrodes that would be very similar to how electrodes in connected microcells would polarize. Similar to what is shown in FIG. 4, FIG. 5 illustrates oxygen being attracted to the positively charged face of each electrode and hydrogen being attracted to the negatively charged face of each electrode.

Ecombustible system 100 is equipped with a power controller 40. In a preferred embodiment, the power controller is characterized by the simultaneous power supply output of between 5 to 1000 microcells, while requiring a very low amount of power. In fact, the power controller 40 is configured so as to limit the total electrical power consumption of the system to the consumption of a single microcell.

The power consumption is reduced to such a significant degree due to a frequency control system. The frequency control system is an electronic system controlled by a microcontroller, which is responsible for generating the electrical pulses to hydrogen production cell 10 in the form of an organized sequence. The overall power control circuit has x number of outputs, 1 to x, where x corresponds to the total number of microcells in hydrogen production cell 10. The electrical pulses are always applied in ascending order of one-microcell-by-one-microcell. The pulses are stepwise. In other words, the frequency control system controls the electrical pulses such that a pulse is applied to microcell 1, then to microcell 2, then to microcell 3, and so on to microcell x. After the pulse is applied to microcell x, then the pulse begins again at microcell 1. This stepwise process of sending electrical pulses into one microcell at a time is repeated indefinitely.

The speed of the pulses and the duration of the pulses applied to each individual microcell are variable. Both speed and duration of the electrical pulses may be controlled manually by a potentiometer. A potentiometer is an instrument for measuring electric potential (voltage) and is known in the art to control electrical devices. The potentiometer manages the electric potential. Manual control allows for changing the frequency of the electrical pulses. The frequency can be set at 1 pulse every 10 seconds up to x pulses per second, again where x is equal the total number of microcells. This ensures that two cells will never receive electrical pulses at the same time. The result is that the power consumption of the entire system never exceeds the power consumption of a single microcell.

For example, assume 10 microcells are connected in series and each consumes 1 kW. The total consumed power would be 10 kW. If, however, only one microcell is connected to electric current at a time, then total power consumption is 10 kW. The present invention provides (in the context of this illustrative example) 10 switches, one switch for each microcell. This enables electric current to turn on and off at the controller's will. Thus, the controller can turn on an electric pulse to the first microcell for 1 second and then turn off the electric pulse. Then, the controller can do the same with the second microcell, and then the same with the third and so on until electric current pulses in each of 10 microcells in the series. After progressing through the series, the electric pulses begin back with the first microcell. During this process, one can measure the consumption of the 10 microcells. The total consumption at any given time will be 1 kW because there is only electric current pulsing through one microcell at a time. Power controller 45 is a circuit that cycles the electric pulses at a very high speed. For each microcell when electricity is "off" the microcell's production is reduced only 4%, as shown in FIG. 9.

Figure 6:
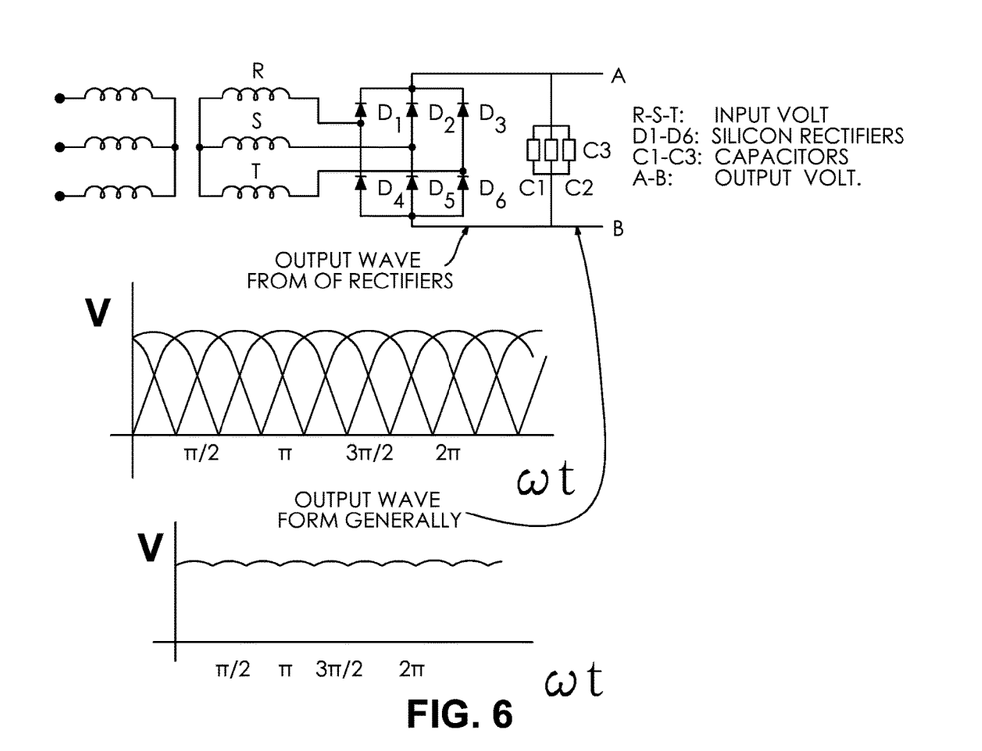
FIG. 6 shows the frequency control system, which is required for maintaining a proper frequency of electric pulses to the hydrogen production cell.

To achieve the frequency required to ensure that two cells will never receive electrical pulses at the same time, the total number of microcells must be considered. To achieve the required frequency, according to the number of cells that make up the whole plant, the frequency varies from 60 Hz to zero (0 Hz). Variable frequency is achieved by a bank of six silicon rectifiers (diodes) in configuration, full-wave rectification and reduce bank capacitor curly wave to a point not detectable by power transistors, as shown in FIG. 6.

Figure 7:
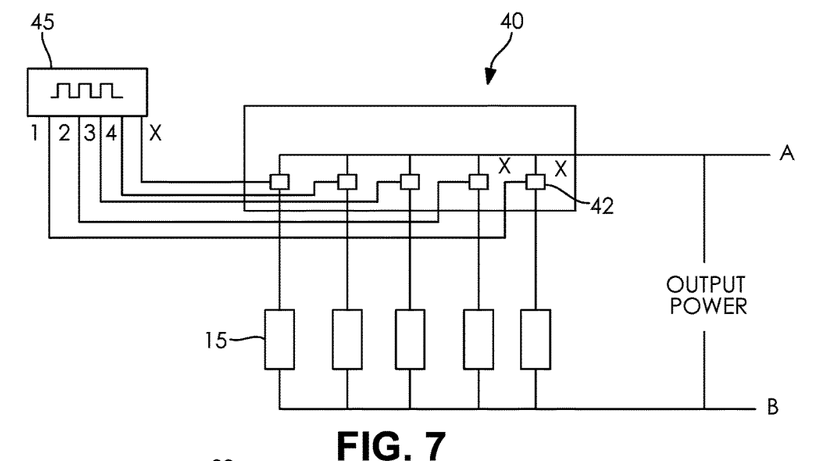
FIG. 7 shows the power control system, which contains a series of transistors corresponding to each micro-cell of the hydrogen production cell for amplifying and switching electronic signals.

Referring to FIG. 7, maintaining low power consumption is also achieved through the implementation of high power transistors 42. High power transistors 42 are able to withstand peak current and cutting off current in each microcell. The present invention provides for the following construction: TRANSISTORS, TRIAC, SCR, IRF, FET, MOSFET, GTO, and RTC, SITH, LASCR. The function of power transistor 42 is to conduct the electric current only when it receives a signal and to cut the power when the signal disappears. Referring to FIG. 7, power transistors 42 are responsible for switching the electric pulse from one microcell 15 to the next. There is a power transistor 42 for each microcell 15. In other words, if there are x cells, there has to be x transistors. The power control system 40 communicates with the transistors by sending a signal when the pulse should be switched to the next cell.

Figure 9:
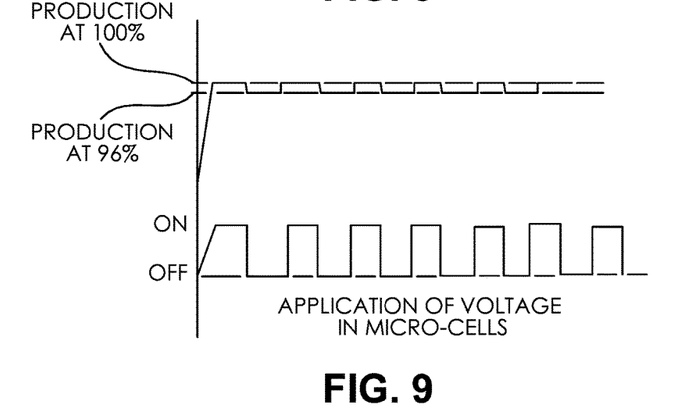
FIG. 9 shows variable production levels of hydrogen by the hydrogen production cell when electric pulses are cycled on and off according to a pulse frequency.
Figure 10:
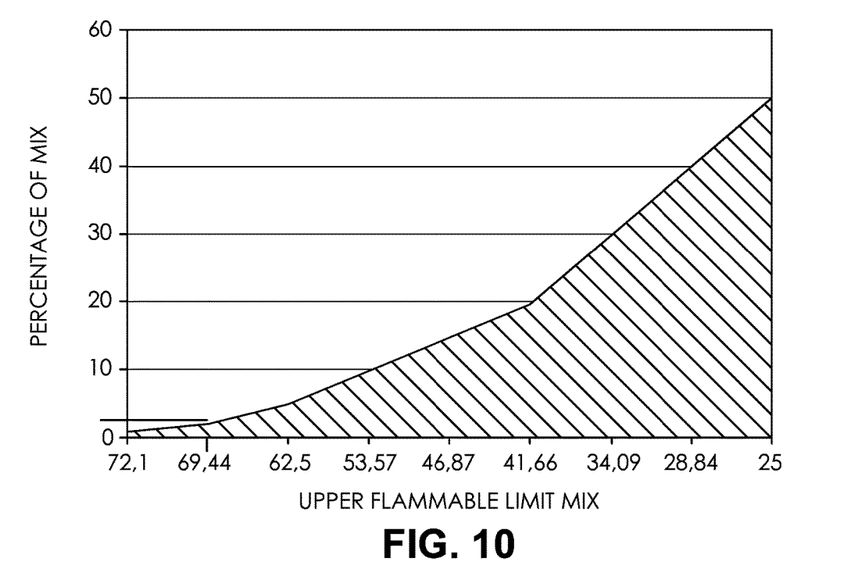
FIG. 10 is a graph showing how the upper flammability limit of methane-hydrogen mixed gas varies with varying percentage of methane in the mixed gas composition.

Referring to FIG. 9, the chart shows that the voltage can be switched on and off. However, due to the unique power control system of the present invention, the hydrogen production does not stop when voltage is turned off. In other words, when there is a lapse in electric pulse from microcell to microcell, hydrogen production continues, albeit at a reduced production rate. Nevertheless, the drop in production from when an electric pulse is being applied in a microcell to when an electric pulse is not being applied is rather minimal—only 4%. While production is reduced by 4%, power consumption is reduced by 100%. Intuitively, when the voltage is off (i.e., not being applied to any microcell), power consumption is zero. Yet, the present invention provides that hydrogen production is maintained during this period of zero power consumption. Electric pulses are applied to each microcell at a frequency of about 7 Hz. The frequency generates in the water inside the microcells an internal vibration called resonance. When the water is in resonance and the electric current is cut off, the water inside the microcells still vibrates at a frequency of about 7 Hz. Resonance and continued vibration keeps breaking water down into hydrogen and oxygen, even when power is switched "off" in that particular microcell.

Magnetic Reactor

Figure 8:
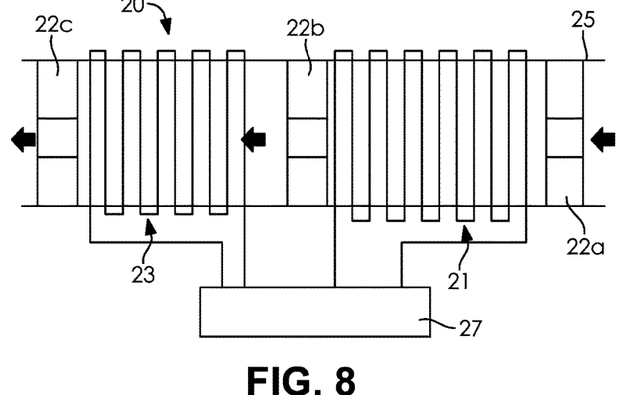
FIG. 8 shows the magnetic reactor used for converting parahydrogen to atomic hydrogen.

Referring to FIG. 8, the magnetic reactor 20 comprises a tube 25, which is constructed of a nonmagnetic material. At one end of tube 25, at a second end of tube 25, and in the center of tube 25, there are three permanent magnets 22a, 22b, and 22c. The magnets are all oriented in the same direction with respect to each other. In other words, if the positive pole of magnet 22a is on the left side the negative pole and of magnet 22a is on the right side, then the positive pole of magnets 22b and 22c are on the left side of each magnet, respectively, and the negative pole of magnets 22b and 22c are on the right side of each magnet, respectively. The magnets are radial magnets, each containing a center hole. Magnets 22a-c are all uniform in size and shape. The diameter of the center hole is approximately equal to ⅓ of the total diameter of one magnet. In a preferred embodiment, the center holes of the magnets have diameters of about ⅝ in.

Two wire coils 21 and 23 wrap around the outside of tube 25. In one embodiment, the coils are both constructed in winding 25-gauge wire, with progressive winding to prevent a thread mount on top of coils—that is, the wire never overlaps itself. In one embodiment, the wire thickness is about 3 inches. Wire coils 21 and 23 are both connected to oscillator 27, which produces a frequency of about 1.98× 1000 Hz up to and including about 2.75×1000 Hz. In one embodiment, the frequency provided by the oscillator is about 2.58×1000 Hz.

Magnetic reactor 20 converts parahydrogen into atomic hydrogen. Conversion is achieved by means of the permanent magnets 22a-c and coils 21 and 23, which in combination create a magnetic field at least around the portion of magnetic reactor 20 to create atomic hydrogen. The force that binds the parahydrogen atoms are aligned magnetically, so when passed through magnetic reactor 20, the alignment becomes misaligned. Misalignment is caused by the force produced by the vibrational frequency created in coils 21 and 23 by oscillator 27.

Exemplary Ecombustible System

Technical Specifications of the Hydrogen Production

| Metric | Unit | Specification |
|---|---|---|
| Production flow | Nm3/h | Min. 60 |
|  |  | Nom. 120 |
| H2 produced | Psi | Nominal 5.0 |
| Temperature | ° C. | Nominal 35 |
| H2 Purity | Vol % | Min. 99.999 |
| Maximum Moisture | Deg. C. | Max. −70 Traces of O2 |
| Content | Vppm | Max. 1 |

Electrical Specifications
Nominal voltage: 220 VAC, phase
Control system: 110 VAC, 1 phase
Rated frequency: 60 Hz Ser. No. 61/792,733
Transformer capacity: 300 KVA
Rectifier capacity: 300 KVA
Tolerances for the Voltage and Frequency of the System
General Power Supply
Frequency: +/−5%
Voltage: +/−5%
Water Supply Conditions
Type: Demineralized

| Metric | Unit | Specification |
|---|---|---|
| Flow | m3/h | Nom. 0.12 |
| Pressure | Psi | Max. 15 |
| Temperature | ° C. | Min. 22 |

Water Supply Quality

| Metric | Unit | Specification |
|---|---|---|
| PH |  | 7.0-8.0 |
| Resistance | Ω cm | Min. ≥1 × 10$^{-5}$ |
| Chlorine Ion | Ppm | Max. 2 |
| Turbidity | Ppm | Max. 1 |

Chemical Preparation Content

Chemicals are applied to the system only once—when loaded with water for the first time. These chemicals have two functions: (1) to prevent internal corrosion and (2) to improve electrical conductivity of the water. The chemicals always remain inside the microcells and they do not decompose over time operating ecombustible system 100.

Potassium hydroxide (KOH): 30 volume %
Vanadium oxide: 10 volume %
Electrolysis System Power Unit
Solid state rectifier.
Supply voltage: 3 phases, 220 VAC+/−5%, 60 Hz.
DC output: 170V/1300 ADC.
Thyristor rectification system, control cubicle.
Operation may be in fully or partially automatic or manual mode.
Switches, buttons, relay, data bus, microprocessors, cables, and other electronic connectors.

Analysis of the Properties of Mixed Gas: Atomic Hydrogen and Methane

Mixtures of dispersed combustible materials will burn only if the fuel concentration lies within well-defined lower and upper bounds determined experimentally. The lower and upper bounds are referred to as flammability limits or explosive limits. The flammability limits of the mixed gas were analyzed. The lower flammability limit is the lowest concentration of gas or a vapor in air capable of producing a flash of fire in the presence of an ignition source. On contrary, the upper flammability limit is the highest concentration of gas or a vapor in air capable of producing a flash of fire in the presence of an ignition source. For this analysis, the proportion of hydrogen combustion variations was observed with variable gas mixture composition. In this exemplary embodiment, the system used methane as the mix gas.

The calculation of the limits of the gas mixture flammability is performed based on the values of each component by applying the rule of Le Chatelier:

$$LM = \frac{1}{\Sigma \frac{XJ}{LJ}}$$

Where:
LM=limit of flammability of the mixture
XJ=volumetric fraction (percentage) of each component
LJ=component XJ upper or lower flammability limit As mentioned, analysis of this exemplary embodiment measured the boundaries of upper and lower flammability of a mixture with variable hydrogen and methane compositions. The following were the results:

| % H | % CH4 | LS | LI |
|---|---|---|---|
| 100% | 0 | 75 | 4 |
| 99% | 1% | 72.1 | 4 |
| 98% | 2% | 69.44 | 4.01 |
| 95% | 5% | 62.5 | 4.04 |
| 90% | 10% | 53.57 | 4.08 |
| 85% | 15% | 46.87 | 4.12 |
| 80% | 20% | 41.66 | 4.16 |
| 70% | 30% | 34.09 | 4.25 |
| 60% | 40% | 28.84 | 4.34 |
| 50% | 50% | 25 | 4.44 |

Figure 11:
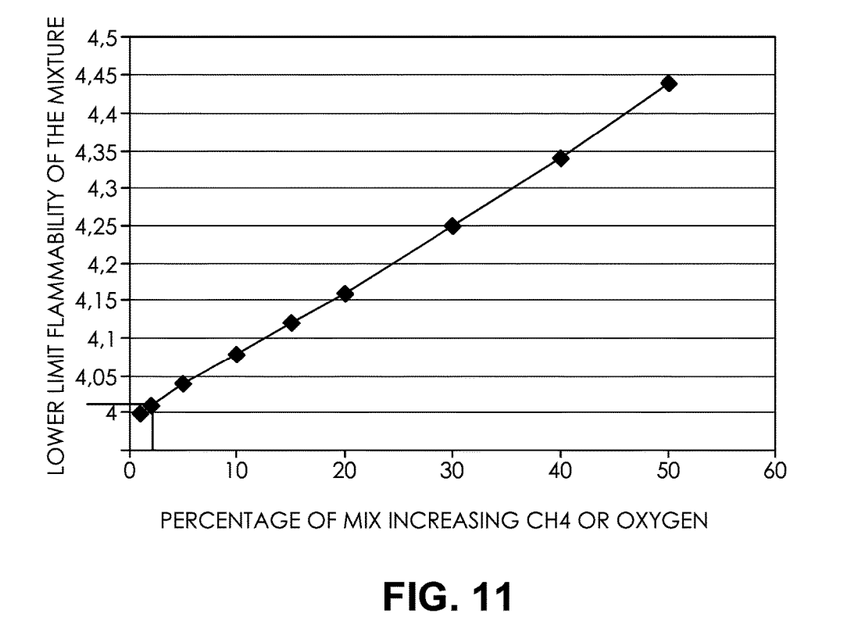
FIG. 11 is a graph showing how the lower flammability limit of methane-hydrogen mixed gas varies with varying percentage of methane in the mixed gas composition.

Where:
LS=upper flammability limit of the mixed gas
LI=lower flammability limit of the mixed gas FIG. 11 shows that the upper flammability limit of the mixed gas decreases as the volumetric fraction of methane increases. FIG. 12 shows that the lower flammability limit of the mixed gas increases as the volumetric fraction of methane increases. A preferred mixed gas has a composition of 2% methane and 98% hydrogen. As one can see from the table and the Figures, the lower flammability limit of pure hydrogen is not significantly different from the lower flammability limit of a mixture of 2% methane-98% hydrogen—only increasing to 4.01 from 4.0. This condition provides for easy ignition under conditions of low oxygen, which is a great advantage in the context of automotive fuel.

PARTS LIST

10=Hydrogen production cell
11=Electrode

12=Electrode
13=Membrane
15=Microcell
18=Positive face of electrode
19=Negative face of electrode
20=Magnetic reactor
21=Wire coil
22a-c=Magnets
23=Wire coil
25=Tube
27=Oscillator
30=Mix tank
40=System control
42=Power transistors
45=Power controller
50=Filter
61=Water supply
62=H2O column
63=Exit stream
64=H2 column
65=Exit stream
66=O2 column
67=Valve
68=Water trap
71=Combustible gas feed
72=Gas holding tank
100=Ecombustible system

What is claimed is:

1. A system for converting orthohydrogen into parahydrogen, converting parahydrogen into atomic hydrogen, and for mixing converted atomic hydrogen with a combustible gas, comprising:
a water supply;
a hydrogen production cell fluidly coupled to the water supply, wherein the hydrogen production cell is configured to cleave water from the water supply into hydrogen and oxygen atoms by electrolysis and to convert orthohydrogen into parahydrogen;
a water trap and filter fluidly coupled to the hydrogen production cell, wherein trace water is separated from the hydrogen produced in the hydrogen production cell;
a magnetic reactor fluidly coupled to the water trap and filter, wherein the magnetic reactor is configured to produce a magnetic field having a frequency of about 1.98 kHz up to and including about 2.75 kHz to convert parahydrogen from the water trap and filter into atomic hydrogen; and
a mix tank fluidly coupled to the magnetic reactor, wherein the mix tank is configured to mix the atomic hydrogen with a combustible gas.

2. The system of claim 1, wherein the hydrogen production cell comprises two or more microcells connected together in series, and wherein each microcell comprises a plurality of electrodes, a hydrogen output, and an oxygen output.

3. The system of claim 2 further comprising a power controller for sending electric pulses into each microcell during electrolysis to make at least one electrode positively charged and at least one electrode negatively charged.

4. The system of claim 3 further comprising a plurality of power transistors for regulating the electric pulses sent into each microcell, wherein a power transistor is assigned to each microcell and each of the power transistors are adapted to communicate with the power controller to either permit or prevent the electric pulses sent to the microcells.

5. The system of claim 2, further comprising a plurality of sets of coils, wherein a set of coils is positioned at the hydrogen output of each microcell and each of the plurality of sets of coils are adapted to apply a vibrational frequency to hydrogen exiting through the hydrogen output of each microcell during electrolysis.

6. The system of claim 5, wherein the plurality of sets of coils are adapted to apply a vibrational frequency that is about equal to the natural frequency of parahydrogen.

7. The system of claim 1, wherein the magnetic reactor comprises a tube, three permanent magnets, and two wire coils wrapped around the outside of the tube that are connected to an oscillator.

8. The system of claim 7, wherein the tube is cylindrical and constructed of a nonmagnetic material, and wherein the three permanent magnets are located inside the tube and are oriented in the same direction.

9. The system of claim 8, wherein the three permanent magnets are all radial magnets of uniform size and shape, each having a center hole about ⅓ of the total diameter of the tube.

10. The system of claim 7 wherein the oscillator produces the frequency of about 1.98 kHz up to and including about 2.75 kHz.

11. The system of claim 1 wherein the combustible gas is oxygen gas or methane gas.

12. The system of claim 1, wherein:
the hydrogen production cell is configured to provide a vibrational frequency that converts orthohydrogen into parahydrogen; and
the magnetic reactor is configured to provide a vibrational frequency that converts parahydrogen into atomic hydrogen.

* * * * *